United States Patent
Lee et al.

(10) Patent No.: US 7,299,498 B2
(45) Date of Patent: Nov. 20, 2007

(54) SYSTEM AND METHOD OF SHARING DIGITAL LITERARY WORKS WHILE PROTECTING AGAINST ILLEGAL REPRODUCTION THROUGH COMMUNICATION NETWORK

(75) Inventors: Cheol-Woong Lee, Seoul (KR); Chang-Young Lee, Seoul (KR)

(73) Assignee: Loudeye Corp., Seattle, WA (US)

( * ) Notice: Subject to any disclaimer, the term of this patent is extended or adjusted under 35 U.S.C. 154(b) by 641 days.

(21) Appl. No.: 09/977,894

(22) Filed: Oct. 15, 2001

(65) Prior Publication Data

US 2003/0078888 A1  Apr. 24, 2003

(30) Foreign Application Priority Data

Mar. 19, 2001  (KR) ............................... 2001-14000

(51) Int. Cl.
    *H04L 9/32*  (2006.01)
(52) U.S. Cl. .................. 726/26; 380/200; 380/201; 380/202
(58) Field of Classification Search ........ 380/201–203, 380/200, 231, 232; 705/57–59, 51–52, 50; 713/200, 193, 150; 709/217–219, 201, 229, 709/225, 203; 726/26–33, 2; 725/41, 42, 725/86, 87, 25, 31
See application file for complete search history.

(56) References Cited

U.S. PATENT DOCUMENTS

| | | | |
|---|---|---|---|
| 5,414,455 A * | 5/1995 | Hooper et al. ............. 725/88 |
| 5,594,796 A * | 1/1997 | Grube et al. ............... 380/270 |
| 6,131,162 A * | 10/2000 | Yoshiura et al. ........... 713/176 |
| 6,212,640 B1 * | 4/2001 | Abdelnur et al. .......... 713/201 |
| 6,385,596 B1 * | 5/2002 | Wiser et al. ................ 705/51 |
| 6,415,280 B1 * | 7/2002 | Farber et al. ............... 707/2 |
| 6,564,170 B2 * | 5/2003 | Halabieh ................... 702/181 |
| 6,564,253 B1 * | 5/2003 | Stebbings .................. 709/217 |
| 6,598,162 B1 * | 7/2003 | Moskowitz ................ 713/176 |
| 6,611,599 B2 * | 8/2003 | Natarajan .................. 380/203 |
| 6,889,211 B1 * | 5/2005 | Yoshiura et al. ........... 705/58 |
| 6,983,371 B1 * | 1/2006 | Hurtado et al. ............ 713/189 |
| 2001/0051996 A1 * | 12/2001 | Cooper et al. .............. 709/217 |
| 2002/0049580 A1 * | 4/2002 | Kutaragi et al. ............ 704/1 |

* cited by examiner

*Primary Examiner*—Kim Vu
*Assistant Examiner*—Nirav Patel
(74) *Attorney, Agent, or Firm*—Alston & Bird LLP

(57) ABSTRACT

A system and method of sharing digital literary works while protecting against an illegal reproduction through a communication network is disclosed. The system comprises a data communication network, a list providing server, at least one agent server, at least one user terminal, a main server, at least one sub-server, a premise communication network, and a network interface unit. The system is advantageous in that it enables users to share digital literary works produced for publicity, works having a low quality, or encrypted digital literary works through the network against a distribution of illegally reproduced digital literary works having the same quality as original literary works through a Sharing Web, thus preventing a reduction of sales amounts of original literary works due to such illegal reproductions.

22 Claims, 4 Drawing Sheets

SYSTEM AND METHOD OF SHARING DIGITAL LITERARY WORKS WHILE PROTECTING AGAINST ILLEGAL REPRODUCTION THROUGH COMMUNICATION NETWORK

BACKGROUND OF THE INVENTION

1. Field of the Invention

The present invention relates in general to a system and method of sharing digital literary works while protecting against an illegal reproduction through a communication network, and more particularly to a system and method of enabling users to share digital literary works produced for publicity, works having a low quality, or encrypted digital literary works through the network to protect against a distribution of illegally reproduced digital literary works having the same quality as original literary works through a sharing network.

2. Description of the Prior Art

Generally, a literary work, which can be stored, reproduced and transmitted in a form of a digital file format, includes a record, an image file, a photograph, a picture, an electronic book file, a software program, etc.

Recently, as Web sites or programs for providing a P2P (Peer To Peer) Sharing Web service on a communication network such as the Internet have been actively proposed and used, various kinds of literary works are illegally reproduced and freely circulated in a simple and easy way through the network without permission of writers.

However, the illegal reproduction of the literary works is problematic in that it rapidly decreases the sales amount of formal literary works, thereby deteriorating the motivation of writers to create literary works, and enormously damaging the literary work-concerned industry.

SUMMARY OF THE INVENTION

Therefore, the present invention has been made in view of the above problems, and it is an object of the present invention to provide a system and method of sharing digital literary works while protecting against an illegal reproduction through a communication network, which enables users to share digital literary works produced for publicity, digital literary works having a low quality, or encrypted digital literary works through the communication network, against a distribution of illegally reproduced digital literary works having the same quality as original literary works through a Sharing Web.

In accordance with one aspect of the present invention, the above and other objects can be accomplished by the provision of a system for sharing digital literary works while protecting against an illegal reproduction through a communication network, comprising a data communication network, a list providing server for providing list information of a Sharing Web, at least one agent server for forming the Sharing Web between users through the data communication network and mediating a data communication through the Sharing Web, at least one user terminal for transmitting and receiving a digital literary work through the Sharing Web, a main server for accessing a Sharing Web listed in the list information provided from the list providing server through the data communication network, searching for the digital literary work shared through the Sharing Web according to a predetermined search condition, determining whether or not the searched digital literary work has an identifier, deciding a digital literary work to be shared among the digital literary works, which are inputted by a supervisor and have a identifier, according to the determination result and literary work information requiring the protection, inputted by the supervisor, and generating accessing information of the Sharing Web, at least one sub-server for receiving information of the digital literary work decided to be shared and the accessing information of the Sharing Web from the main server, connected to the agent server depending on the accessing information, and allowing a sharing of the digital literary work decided to be shared, a premise communication network for connecting the main server and the sub-server to each other, and a network interface unit for connecting the premise communication network to the data communication network.

In accordance with another aspect of the present invention, there is provided a method of sharing digital literary works while protecting against an illegal reproduction through a communication network, comprising the steps of a) inputting and storing literary work information requiring the protection of its copyright and a digital literary work having an identifier in a main server by a supervisor, b) connecting said main server to an agent server mediating a Sharing Web by the main server, and searching for a digital literary work shared through the Sharing Web according to a search condition set by the supervisor, c) downloading the searched digital literary work from the Sharing Web to the main server, determining whether or not the identifier exists in the digital literary work, and deciding the digital literary work to be "pass" or "fail" with respect to its shareability according to the determination result by the main server, d) generating and storing information of a digital literary work to be shared by the main server against the digital literary work decided to be "fail" as to its shareability among the digital literary works having the identifier, according to the literary work information requiring the protection of its copyright, and e) accessing the Sharing Web, sharing a list of the digital literary work to be shared, and transmitting the list to the user when a transmission request for the digital literary work to be shared from a predetermined Sharing Web user is received.

In accordance with still another aspect of the present invention, there is provided a method of sharing digital literary works while protecting against an illegal reproduction through a communication network, comprising the steps of a) inputting and storing literary work information requiring the protection of its copyright and a digital literary work having an identifier in a main server by a supervisor, b) connecting the main server to an agent server mediating a Sharing Web by the main server, and searching for a digital literary work shared through the Sharing Web according to a search condition set by the supervisor, c) downloading the searched digital literary work from the Sharing Web to the main server, determining whether or not the identifier exists in the digital literary work, and deciding the digital literary work to be "pass" or "fail" with respect to its shareability according to the determination result by the main server, d) generating and storing information of a digital literary work to be shared by the main server against the digital literary work decided to be "fail" among the digital literary works having the identifier according to the literary work information requiring the protection of its copyright by the main server, e) generating and storing accessing information of the Sharing Web, and determining a division of system resources required to share the digital literary work to be shared by the main server, f) transmitting a sharing execution command from the main server to a sub-server in response to the division information of system resources, and g) connecting the sub-server to the main server, receiving the accessing information of Sharing Web to be accessed and information of the digital literary work to be shared according to the sharing execution command from the main server, accessing the Sharing Web by the accessing information, and allowing a sharing of the digital literary work to be shared.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
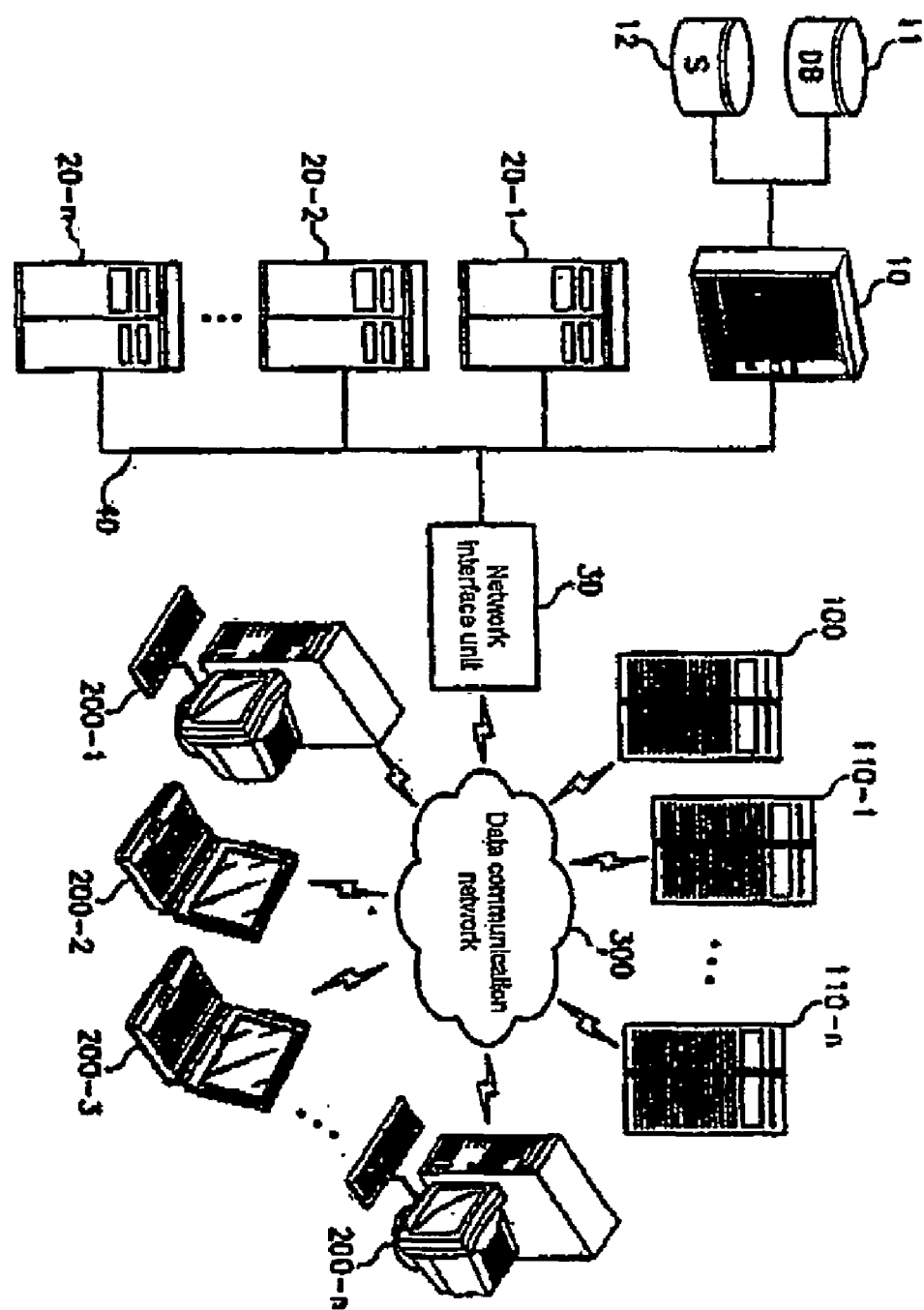
FIG. 1 is a block diagram showing a digital literary work sharing system for protecting against an illegal reproduction through a communication network according to preferred embodiment of this invention.

FIG. 1 is a block diagram showing a digital literary work sharing system for protecting against an illegal reproduction through a communication network according to the present invention. Referring to FIG. 1, the system comprises a main server 10, one or more sub-servers 20-1 through 20-n, a network interface unit 30, a premise communication network 40, at least one P2P list providing server 100, one or more P2P agent servers 110-1 through 110-n, one or more user terminals 200-1 through 200-n, and a data communication network 300.

The main server 10 accesses a P2P (Peer to Peer) Sharing Web (hereinafter, referred to as P2P Web), searches for a digital literary work shared through the Sharing Web according to a predetermined search condition, and receives the searched digital literary work. Then, the main server 10 determines whether or not the searched digital literary work has an identifier, decides which digital literary work is to be shared among the digital literary works, which are inputted by a supervisor and have a identifier, according to the determination result and literary work information requiring the protection and inputted by the supervisor, and generates an accessing information of the P2P Web.

The sub-servers 20-1 through 20-n are connected to the main server 10, receive the information of the digital literary works decided to be shared and the accessing information of the P2P Web from the main server 10, access the P2P Web depending on the accessing information, and allow the users to share the digital literary works decided to be shared through the P2P Web.

The network interface unit 30 is an intermediary, which connects the main server 10 and the sub-servers 20-1 through 20-n to the data communication network 300 and performs data communication. For example, the network interface unit 30 may be preferably selected from a CSU (Channel Service Unit) or a DSU (Digital Service Unit), and may include a router and etc.

The premise communication network 40 connects the main server 10, the sub-servers 20-1 through 20-n and the network interface unit 30 to each other, and may be a LAN (Local Area Network) for example.

The P2P list providing server 100 provides a list information of the P2P Web(for example, IP address of an agent server for mediating the P2P Web and port number). The P2P agent servers 110-1 through 110-n form the P2P Sharing Web in the network 300, and mediate a sharing of the digital literary work between the subscribers (or users) through the P2P Web.

The user terminals 200-1 through 200-n are the computer terminals which enable the users to be connected to the P2P agent servers 110-1 through 110-n through the data communication network 300, access the P2P Web through the P2P agent servers 110-1 through 110-n, and exchange the digital literary works through the P2P Web.

The data communication network 300 is a wide area communication network that performs the data communication between the network interface unit 30, the P2P list providing server 100, the P2P agent servers 110-1 through 110-n, and the user terminals 200-1 through 200-n. For example, the network 300 may be an "Internet".

The servers 10, 20-1 through 20-n, 100, 110-1 through 110-n and the user terminals 200-1 through 200-n have a general hardware device (not shown) included in a computer system, such as a main processor, a network adapter, a display adapter, a main memory and an auxiliary memory, and an operating system (OS). The specific construction and operation of the servers 10, 20-1 through 20-n, 100, 110-1 through 110-n and the user terminals 200-1 through 200-n is well known in the field and further explanation is thus not deemed necessary.

Hereinafter, an operation sample of the present invention having the construction above will be described in detail referring to the accompanying drawings.

Figure 2A:
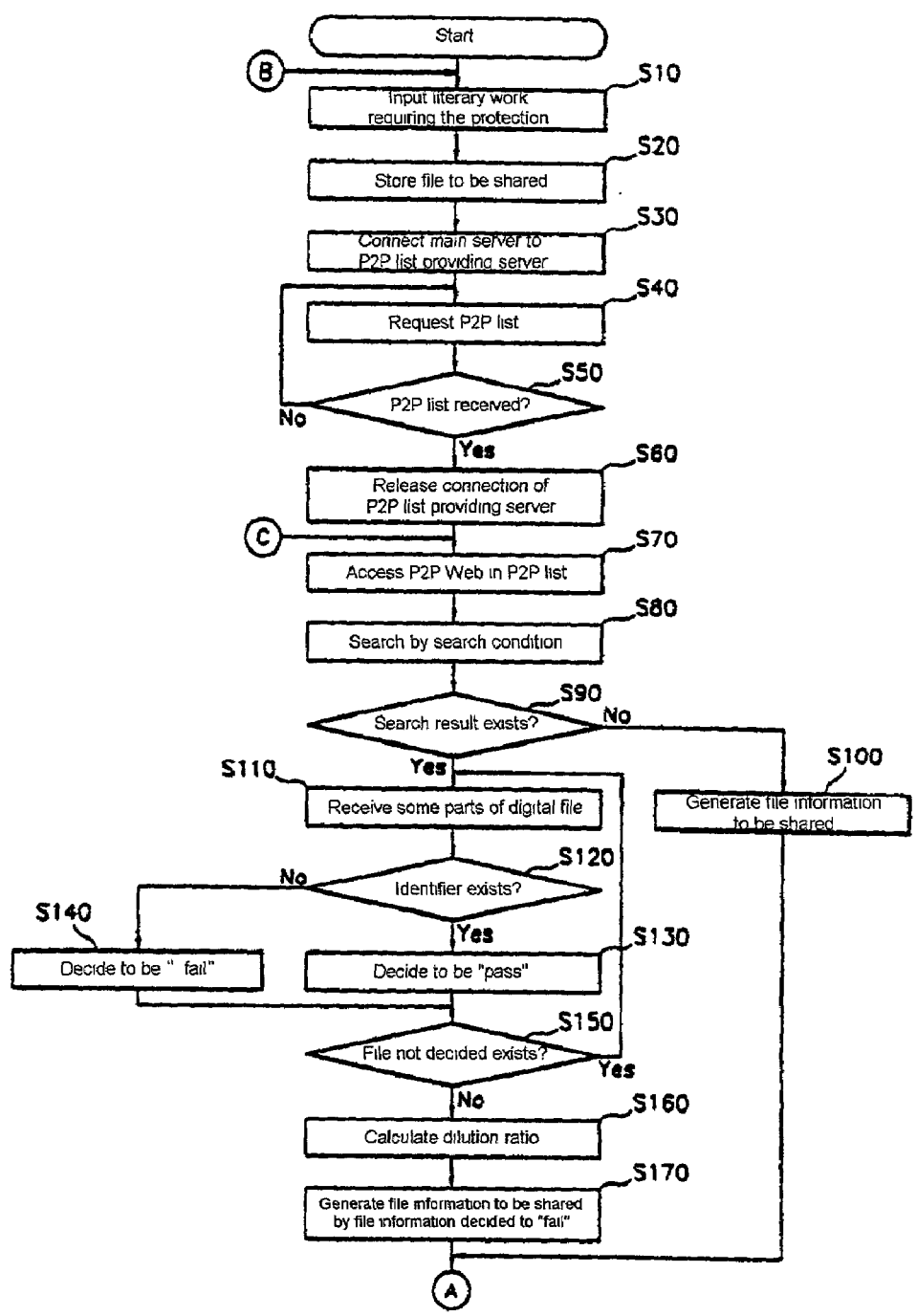
FIG. 2a and FIG. 2b are flowcharts showing a control process of a main server of this invention.
Figure 2B:
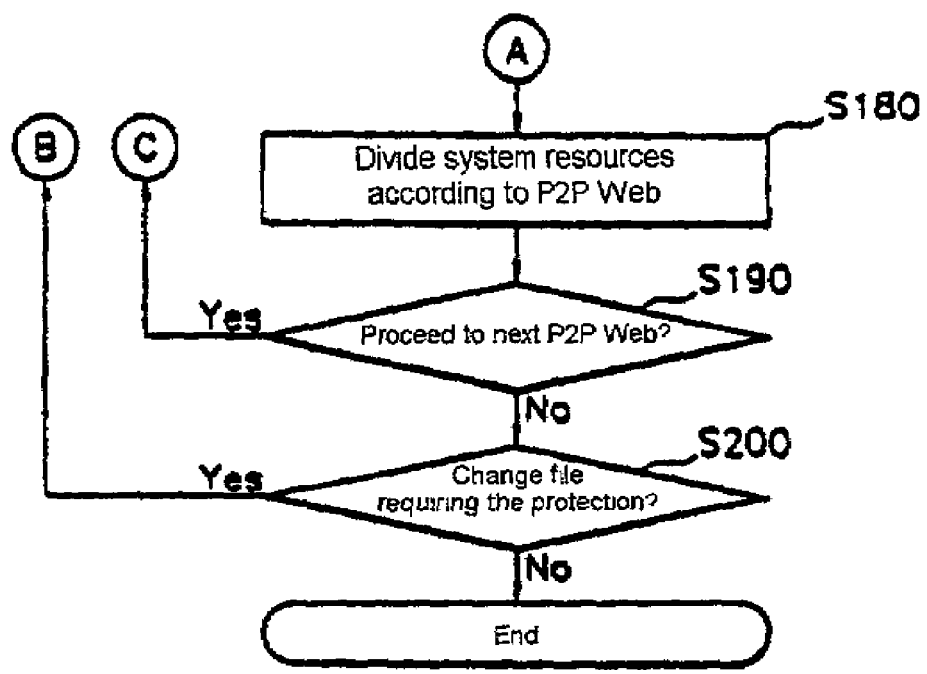
Figure 3:
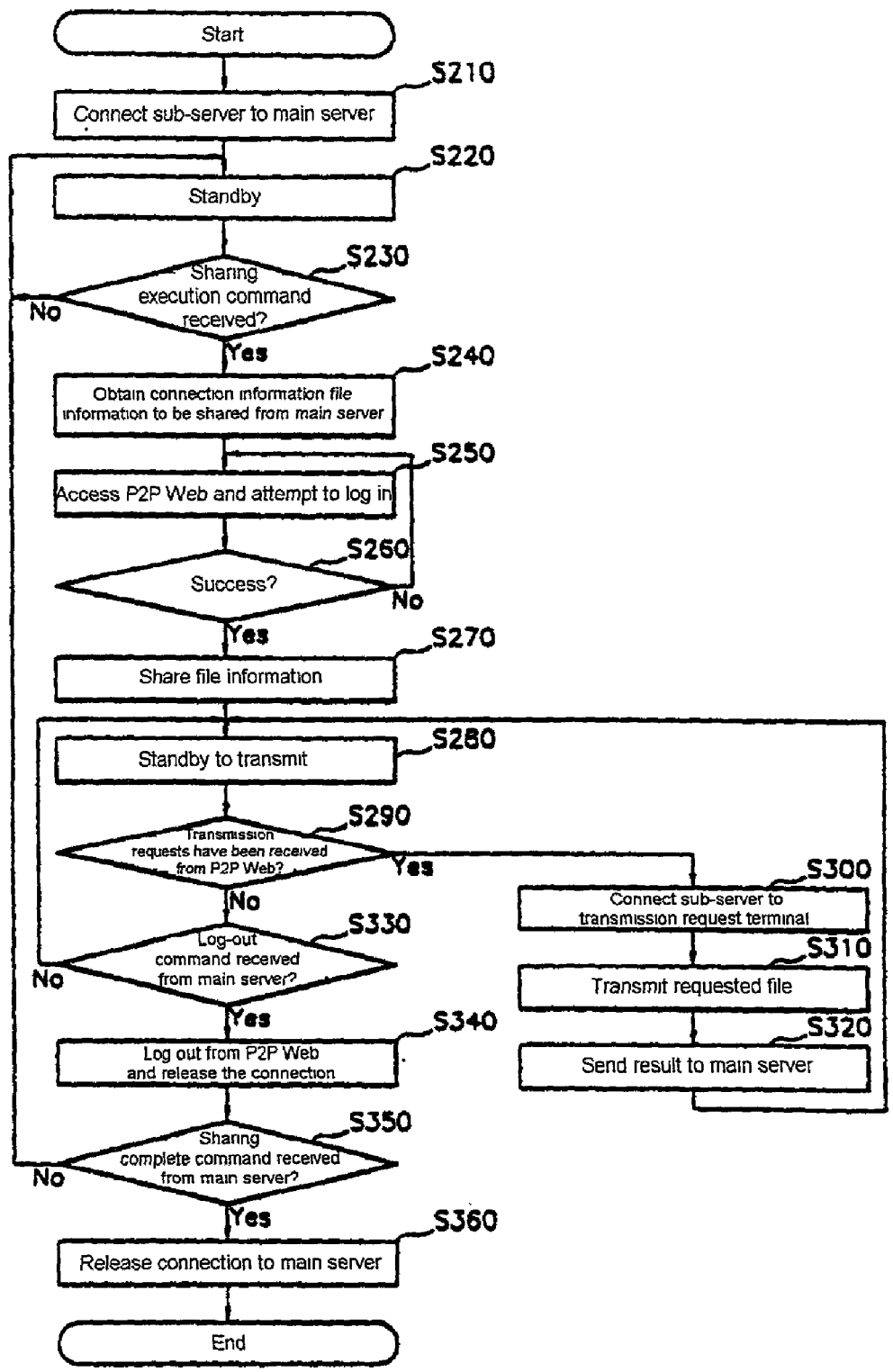
FIG. 3 is a flowchart showing a control process of a sub-server of this invention.

FIGS. 2a and 2b are flowcharts showing the control process of a main server 10 shown in FIG. 1.

First, the control process of the main server 10 for receiving a P2P list in connection with the P2P list providing server 100, accessing the P2P Web, searching for the digital literary work shared through the P2P Web, and generating the file information to be shared on the P2P Web and the accessing information of the P2P Web is described in detail.

When the supervisor activates the main server 10 by supplying power and executes a sharing search program for the main server, stored in the main server 10, the sharing search program is loaded to a main memory of the main server 10 and executed by a processor therein.

The main server 10 displays a Web page for user interface of the sharing searching program on its display unit. The supervisor may input literary work information requiring the protection through the Web page for the user interface of the sharing search program at step S10. As an example, the literary work information requiring the protection includes various kinds of the literary works such as a record or an image file, a writer and title of the literary work.

Further, when the supervisor assigns a digital file of a corresponding literary work, which is stored in a predetermined medium or network path and has an identifier, the assigned digital file is sent to a storage unit 12 by the main server 10 and stored in a corresponding area of the storage unit 12 at step S20.

The digital file having the identifier may include an advertising digital file, a digital file deteriorated in its quality and an encrypted digital file. Preferably, the advertising file, the deteriorated file and the encrypted file are pre-produced by a predetermined method (for example, by manual task using an editing tool with a software format). The advertising digital file is the digital literary work for publicity, which is formally produced and distributed by a writer, a production and distribution company of a corresponding literary work, and a company for managing the main server 10 and the sub-servers 20-1 through 20-n. Further, the advertising digital file is produced by extracting only some parts not the entire parts of an original literary work for the purpose of "Pre-View" or "Pre-Listening", or by deteriorating its value by, for example, inserting an advertising paragraphs or an interview with the writer in the original literary work.

On the other hand, the digital file deteriorated in its quality is produced by significantly lowering the quality of the original literary work. For example, providing that the deteriorated digital file is a music file or an image file, the music file is produced by deteriorating or damaging a sound quality of a music file of the original record, and the digital image file is produced by deteriorating an image quality and sound quality of an original image file.

For example, a method of deteriorating or damaging the sound quality of the digital music file may include the functions of 1) inserting noise components such as a speech for publicity by a singer or performer in the music, 2) lowering a sampling rate of the digital music file to below that of an original music(typically, digital file with MP3 format has a sampling rate of 44.1 KHz) 3) distorting a waveform of the music file, and 4) converting a multi-channel sound of the music file to a single-channel sound.

Further, the encrypted music file is produced by encrypting the original file using a well-known encryption algorithm. Here, it is possible to use any one of well-known symmetric key encryption algorithms and public key encryption algorithms as the encryption algorithm, however it is preferable to adopt the public key encryption algorithms, considering a division of the keys.

Generally, the public key encryption algorithm so-called "asymmetric key encryption algorithm" is characterized in that it uses two different keys for encryption and decryption. One of the keys is a so-called private key and the other is a so-called public key. Typically, the public key is used in encryption and the private key is used in decryption. Providing that the public key encryption algorithm is adopted in the present invention, the digital file is encrypted with a pubic key authenticated by a predetermined authentication organization, such that only a user having a private key can decrypt the digital file.

Further, an identifier, which can be identified only by the managing company of the main server 10 and the sub-servers 20-1 through 20-n, is inserted in each of the advertising digital file, the deteriorated file and the encrypted file. For example, the identifier is a watermark inserted in the first parts or latter parts, or both parts of the digital file.

The inserted position of the identifier is determined depending on a start position of file transmission according to transmission rules contracted between the main server 10 and the P2P agent servers 110-1 through 110-n. Here, if the main server 10 requests a transmission of a predetermined digital file of the P2P Web agent servers 110-1 through 110-n, and then the P2P Web agent servers 110-1 through 110-n start to transmit the first parts of the digital file, the identifier is inserted in the first parts of the advertising digital file, the digital file with a low quality, or the encrypted digital file. On the other hand, if the P2P Web agent servers 110-1 through 110-n start to transmit the latter parts of the digital file, the identifier is inserted in the latter parts of the advertising digital file, the digital file with a low quality, or the encrypted digital file.

The reason for determining the inserted position of the identifier depending on the transmission start position of the digital file according to the contracted transmission rules is that the main server 10 receives only some parts of the digital file searched through the P2P Web, and detects the identifier from them at step S110, as will be described in more detail later.

In case the transmission rules between the main server 10 and agent servers 110-1 through 110-n are indefinite or different from each other, it is possible to insert the identifier into both the first and latter parts of the advertising digital file, the digital file with a low quality, or the encrypted digital file.

Moreover, the main server 10 accesses the data communication network 300 through the network interface unit 30 according to a selection of the supervisor, and then is connected to the P2P list providing server 100 via the network 300 at step S30. Following the step S30, the main server 10 sends a request signal to the P2P list providing server 100 at step 40 for a transmission of the P2P list information.

The main server 10 checks a response from the P2P list providing server 100 and determines whether or not the P2P list requested at step S40 has been received from the server 100 at step S50. If it is determined that the requested P2P list information is not received from the server 100, a processing step of the main server 10 returns to step S40 and re-sends the request signal to the server 100 for transmission of the P2P list information.

On the other hand, if it is determined that the requested P2P list information has been received from the server 100, the main server 10 stores the P2P list received from the server 100, and releases its connection to the server 100 at step S60.

Generally, the P2P list information received from the P2P list providing server 100 is stored in the predetermined area of the storage unit 12, however, it can be stored in a database 11 through the process of a schema conversion or a mapping.

Next, the main server 10 accesses the data communication network 300 through the network interface unit 30 according to a selection of the supervisor or an automatic execution algorithm of the sharing search program for the main server 10, and is connected to the agent servers 110-1 through 110-n mediating the P2P Web according to the P2P list information received from the P2P list providing server 100 at step S70.

In this case, the main server 10 decides a sequence of accessing each P2P Web listed in the received P2P list by a predetermined rule, and is connected to the agent servers 110-1 through 110-n mediating each P2P Web sequentially according to the accessing sequence at step S70. For example, the decision rule of the accessing sequence can be made by arraying the P2P Web depending on a sequence of numbers of IP (internet protocol) addresses.

Then, the main server 10 sends a predetermined search condition to any one of the P2P Web agent servers 110-1 through 110-n through the data communication network 300, and searches for the digital file at step S80. The search condition is set through the Web page for the user interface of the sharing search program for the main server 10 by the supervisor. As an example, the search condition includes the name of a writer and the title of the literary work. Further, in the case of a music file, the search condition may include a sampling rate of the music file.

Next, the main server 10 receives the search results from any one of the servers 110-1 through 110-n through the data communication network 300, and determines whether or not the search result value corresponding to the search condition has existed in the search result at step S90.

If it is determined that there is no result value corresponding to the condition, the main server 10 decides all the files having the identifier (e.g. the advertising digital file, the digital file with a low quality, or the encrypted digital file), which correspond to the literary work requiring the protection inputted by the supervisor at step S10 and stored in the storage unit 12 at step S20, to be shared, generates information of the digital file decided to be shared, and stores the information in the database 11 at step S100.

On the other hand, if it is determined that there has been a search result value corresponding to the search condition at step S90, the main server 10 receives only some parts of the searched digital file from user terminals 200-1 through 200-n connected to the P2P Web at step S110.

As an example, the reception of only some parts of the digital file can be performed by sending a digital file transmission request signal from the main server 10 to the user terminals 200-1 through 200-n connected to the P2P Web, receiving the digital file from a corresponding user terminal, and stopping the reception of the digital file from the user terminal if the capacity of the received digital file exceeds the preset capacity.

The reception of the digital file at step S110 is performed so as to determine whether or not the identifier inserted by the managing company of the main server 10 and the sub-servers 20-1 through 20-n exists in the digital file shared through a corresponding P2P Web. As described above, the identifier is inserted into the first or latter parts, or both parts of the digital file according to the file transmission rules between the main server 10 and the agent servers 110-1 through 110-n. For this reason, the main server 10 receives only some parts, for example first parts of the digital file which are required to determine the existence of the identifier, while considering a searching time and a storage capacity of the main server 10, not the remaining parts thereof.

Next, the main server 10 determines whether or not the identifier has existed in the received digital file by detecting the identifier (e.g. a watermark) at step S120. If the identifier has existed in the digital file according to the determination result, the digital file is decided to be "pass" with respect to its shareability at step S130. On the other hand, if there is no identifier in the digital file, the digital file is decided to be "fail" at step S140. The determination result is stored in the storage unit 12 of the main server 10 as data, or stored in the database 11.

Further, the main server 10 determines whether or not among the searched digital files, there has remained a file not decided yet as to its shareability at step S150. If any file not decided remains, a processing step of the main server 10 returns to step S110 to receive the digital file not decided as to its shareability. However, if there is no file not decided as to its shareability, the main server 10 calculates a dilution ratio(Δd) by the following Equation 1 at step S160, $$\Delta d = \frac{P\_fn}{S\_fn} \times 100[\%] \quad [1]$$

wherein P_fn is the number of files decided to be "pass", and S_fn is the total number of searched files. The dilution ratio calculated at step S160 may be used as reporting data of a record corporation or a movie corporation, or a reference data required to an operation of the supervisor.

Then, the main server 10 determines the digital file with a same writer, title of the literary work as the digital file decided to be "fail" among the digital files (e.g. the advertising, deteriorated or encrypted digital files having the identifier), which correspond to the literary work information requiring the protection inputted by the supervisor and are stored in the storage unit 12, as the digital file to be shared as opposed to the file decided to be "fail". Then, the main server 10 stores the digital file, determined to be shared, in the database 11 at step S170.

Generally, an index information is included in the data table of the digital file searched through the P2P Web and stored in the storage unit 12. The main server 10 detects a writer or the title of the literary work by the index information in the data table of the searched or stored digital file. The searched digital file not having information of the writer and the title of the literary work is stored separately and processed with a manual task by the supervisor.

The main server 10 decides a division of the system resources according to each P2P Web. In other words, the main server 10 decides a corresponding sub-server 20 for sharing the digital file according to each P2P Web, generates accessing information according to each P2P (for example, IP address of the P2P Web agent server and a port number) and stores the accessing information in the storage unit 12 or the database 11 at step S180.

Thereafter, the main server 10 determines whether to proceed from the current P2P Web to a next P2P Web at step S190. In this case, the determination to proceed is made by the selection of the supervisor or the preset sequence, thus allowing the main server 10 to automatically access the next P2P Web. However, in case that the main server 10 wishes to access the next P2P Web according to the preset sequence, if the current Web is the last with no following P2P Web, the main server 10 determines to not to proceed to the next P2P Web.

On the other hand, if it is determined that the main server 10 proceeds from the current P2P Web to the next P2P Web, the main server 10 returns to step S70 and accesses the next P2P Web.

Further, when deciding to proceed to the next P2P Web, the main server 10 asks the supervisor to change a digital file requiring the protection of its copyright through the Web page for user interface of the sharing search program at step S200. If the supervisor decides to change the digital file requiring the protection of its copyright, a processing step of the main server 10 returns to step S10. On the other hand, if the supervisor decides to not change the file, the main server 10 stops its control operation.

Hereinafter, the process of accessing the P2P Web by the sub-servers 20-1 through 20-n under the control of the main server 10, and sharing the digital literary work decided to be shared by the main server 10 are described in detail.

The supervisor primarily activates the sub-servers 20-1 through 20-n by supplying power. When the sub-servers 20-1 through 20-n run their sharing program, the sharing program is loaded to each main memory of the sub-servers 20-1 through 20-n and executed by each processor thereof.

The sub-servers 20-1 through 20-n are commonly connected to a communication port of the main server 10 via the premise communication network 40 by the executed sharing program for the sub-server at step S210, and stand by at step S220.

The sub-servers 20-1 through 20-n in standby status determine whether a sharing execution command has been received from the main server 10 via the premise communication network 40 at step S230. If the sharing execution command is not received yet from the main server 10, the sub-servers 20-1 through 20-n return to step S220 and maintain their standby status.

On the other hand, if the sharing execution command has been received from the main server 10, the sub-servers 20-1 through 20-n obtain both the accessing information of P2P Web to be connected and file information to be shared at step S240.

In order to obtain the accessing information and the file information at step S240, the main server 10 sends the sharing execution command to the sub-servers, and searches the data stored in the database 11 and the storage unit 12 for the accessing information and file information, and transmits them to the sub-servers 20-1 through 20-n. Alternatively, the information may be obtained when the sub-servers 20-1 through 20-n access the database 11 and the storage unit 12 of the main server 10 according to preset value, thus enabling the sub-servers 20-1 through 20-n to read the accessing information and the file information from the database 11 and the storage unit 12.

Then, the sub-servers 20-1 through 20-n access the data communication network 300 via the network interface unit 30 according to the obtained accessing information at step S240, and are connected to the agent servers 110-1 through 110-n.

Further, the sub-servers 20-1 through 20-n transmit a reset user ID (identifier) and a secret number to the P2P Web agent servers 110-1 through 110-n via the network 300, and attempt to log in at step S250.

Then, the sub-servers 20-1 through 20-n determine whether or not a signal indicating a success of the log-in and allowability of connection has been received from the agent servers 110-1 through 110-n after a predetermined period of time at step S260. If the signal is not received or another signal indicating a failure of the log-in is received, the sub-servers 20-1 through 20-n return to step S250 and are reconnected to the agent servers 110-1 through 110-n, and attempt to log in.

On the other hand, if the signal indicating the log-in success and the allowability of connection has been received, the sub-servers 20-1 through 20-n transmit the list information of the digital file to be shared to the agent servers 110-1 through 110-n, thus allowing the users connected to the P2P Web to share the digital file such that the users read the digital file freely on the P2P Web at step S270.

Next, the sub-servers 20-1 through 20-n stand by to transmit a corresponding digital file when the transmission requests for the digital file are received from the user terminals 200-1 through 200-n connected to the P2P Web on accessing at step S280.

In the state of standby, the sub-servers 20-1 through 20-n determine whether or not the transmission requests for the digital file have been received from the user terminals 200-1 through 200-n at step S290.

If the transmission requests have been received from at least any one of the user terminals 200-1 through 200-n, the sub-servers 20-1 through 20-n open the communication port to the user terminal requesting the file transmission, send information of the opened communication port to the user terminal, and allow a connection of the user terminal at step S300.

Then, the sub-servers 20-1 through 20-n transmit the requested digital file to the user terminal over the data communication network 300 at step S310. The digital file is the advertising, deteriorated or encrypted digital file of the literary work, which is stored in the main server 10 at step S20 and has an identifier. In this case, the sub-servers 20-1 through 20-n previously receive and store the digital file from the main server 10, and transmit it to the user terminal when receiving the file transmission request from the user terminal. Otherwise, the sub-servers 20-1 through 20-n can transmit the digital file to the user terminal by reading it from the main server 10 through the premise communication network 40 whenever receiving a transmission request.

When the file transmission is completed, the sub-servers 20-1 through 20-n send the details of transmission of the digital file (for example, the title of the digital file and a transmitting time) to the main server 10 via the premise communication network 40 at step S320, and a processing step of the sub-servers returns to step S280.

On the other hand, if no file transmission request is received from the user terminals connected to the P2P Web for a predetermined period of time according to the determination result at step S290, the sub-servers 20-1 through 20-n determine whether or not a control command indicating a log-out from the P2P Web connected to the user terminal has been received from the main server 10 at step S330. If the control command is not received from the main server 10, a processing step of the sub-servers 20-1 through 20-n returns to step S280. However, if the control command has been received from the main server 10, the sub-servers 20-1 through 20-n transmit log-out signals to the agent servers 110-1 through 110-n, and release their connections to the P2P Web at step S340.

Then, the sub-servers 20-1 through 20-n determine whether or not a sharing complete command has been received from the main server 10 at step S350. If the sharing complete command is not received from main server 10, the next processing step of the sub-servers 20-1 through 20-n returns to step S220, and the sub-servers 20-1 through 20-n stand by to receive a command from the main server 10. On the other hand, if the sharing complete command has been received from the main server 10, the sub-servers 20-1 through 20-n release their connections to the main server 10 through the premise communication network 40 at step S360.

As apparent from the above description, the present invention provides a system and method of enabling users to share digital literary works produced for publicity, having a low quality, or encrypted digital literary works through the network while protecting against a distribution of illegally reproduced digital literary works having the same quality as original literary works through a Sharing Web, thus preventing a reduction of sales amounts of original literary works due to the distribution of illegal reproductions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for sharing digital literary works while protecting against an illegal reproduction through a communication network, comprising:
   a data communication network;
   a list providing server for providing list information of a Sharing Web;
   at least one agent server for forming the Sharing Web between users through the data communication network and mediating a data communication through the Sharing Web;
   at least one user terminal for transmitting and receiving a digital literary work through the Sharing Web;

a main server for accessing a Sharing Web listed in the list information provided from the list providing server through the data communication network, searching for the digital literary work shared through the Sharing Web according to a predetermined search condition, determining whether or not the searched digital literary work has an identifier which is associated with at least one of a plurality of variably located portions of the digital literary work, deciding a digital literary work to be shared among the digital literary works, which are inputted by a supervisor and have a identifier, according to the determination result and literary work information requiring the protection, inputted by the supervisor, and generating accessing information of the Sharing Web, the decision regarding whether to share the digital literary work being based only on existence of the identifier in the digital literary work;

at least one sub-server for receiving information of the digital literary work decided to be shared and the accessing information of the Sharing Web from the main server, connected to the agent server depending on the accessing information, and allowing a sharing of the digital literary work decided to be shared;

a premise communication network for connecting the main server and the sub-server to each other; and a network interface unit for connecting the premise communication network to the data communication network, wherein a position of the identifier within the digital literary work is determined based on transmission rules between the main server and the at least one agent server.

2. The system as set forth in claim 1, wherein the sub-server reads a corresponding digital literary work from the main server whenever receiving a file transmission request for the shared digital literary work from the user terminal connected to the sub-server via the Sharing Web, and transmits said read digital literary work to the user terminal.

3. The system as set forth in claim 1, wherein the sub-server pre-reads the digital literary work decided to be shared from the main server and stores it, and transmits the stored digital literary work to the user terminal when receiving a file transmission request from the user terminal connected to the sub-server via the Sharing Web.

4. The system as set forth in claim 1, wherein the digital literary work having the identifier is an advertising digital literary work formally produced and distributed for publicity by a writer, a production and distribution company of the literary work, or a server managing company.

5. The system as set forth in claims 1, wherein the digital literary work having the identifier is a digital literary work edited with a reduction in its quality to a level lower than that of an original digital literary work.

6. The system as set forth in claims 1, wherein the digital literary work having the identifier is a digital literary work encrypted with a predetermined encryption key.

7. A method of sharing digital literary works while protecting against an illegal reproduction through a communication network, comprising the steps of:

a) inputting and storing literary work information requiring the protection of its copyright and a digital literary work having an identifier in a main server by a supervisor, the identifier being associated with at least one of a plurality of variably located portions of the digital literary work;

b) connecting said main server to an agent server mediating a Sharing Web by the main server, and searching for a digital literary work shared through the Sharing Web according to a search condition set by the supervisor;

c) downloading the searched digital literary work from the Sharing Web to the main server, determining whether or not the identifier exists in the digital literary work, and deciding the digital literary work to be "pass" or "fail" with respect to its shareability according to the determination result by the main server, the decision regarding shareability being based only on existence of the identifier in the digital literary work;

d) generating and storing information of a digital literary work to be shared by the main server against the digital literary work decided to be "fail" as to its shareability among the digital literary works having the identifier, according to the literary work information requiring the protection of its copyright; and e) accessing the Sharing Web, sharing a list of the digital literary work to be shared, and transmitting the list to the user when a transmission request for the digital literary work to be shared from a predetermined Sharing Web user is received, wherein a position of the identifier within the digital literary work is determined based on transmission rules between the main server and the agent server.

8. The method as set forth in claim 7, wherein at step d) if there is no search result value corresponding to the search condition, all the digital literary works having the identifier corresponding to the literary work requiring the protection of its copyright inputted by the supervisor are determined to be shared.

9. The method as set forth in claim 7, further comprising the step of calculating a dilution ratio of the number of digital literary works decided to be "pass" as to its shareability to the total number of searched digital literary works.

10. The method as set forth in claim 7, wherein the digital literary work having the identifier is an advertising digital literary work, formally produced and distributed for publicity by a writer, a production and distribution company of the literary work, or a server managing company.

11. The method as set forth in claim 7, wherein the digital literary work having the identifier is the digital literary work edited with a reduction in its quality to a level lower than that of an original digital literary work.

12. The method as set forth in claim 7, wherein the digital literary work having the identifier is a digital literary work encrypted with a predetermined encryption key.

13. The method as set forth in claim 7, wherein the identifier is inserted into the digital literary work by a server managing company.

14. The method as set forth in claim 7, wherein the identifier is a watermark.

15. A method of sharing digital literary works while protecting against an illegal reproduction through a communication network, comprising the steps of:

a) inputting and having literary work information requiring the protection of its copyright and a digital literary work having an identifier in a main server by a supervisor, the identifier being associated with at least one of a plurality of variably located portions of the digital literary work;

b) connecting the main server to an agent server mediating a Sharing Web by the main server, and searching for a digital literary work shared through the Sharing Web according to a search condition set by the supervisor;

c) downloading the searched digital literary work form the Sharing Web to the main server, determining whether or not the identifier exists in the digital literary work, and deciding the digital literary work to be "pass" or "fail" with respect to its shareability according to the determination result by the main server the decision regarding shareability being based only on existence of the identifier in the digital literary work;

d) generating and storing information of a digital literary work to be shared by the main server against the digital literary work decided to be "fail" among the digital literary works having the identifier according to the literary work information requiring the protection of its copyright by the main server;

e) generating and storing accessing information of the Sharing Web, and determining a division of system resources required to share the digital literary work to be shared by the main server;

f) transmitting a sharing execution command from the main server to a sub-server in response to the division information of system resources; and g) connecting the sub-server to the main server, receiving the accessing information of Sharing Web to be accessed and information of the digital literary work to be shared according to the sharing execution command from the main server, accessing the Sharing Web by the accessing information, and allowing a sharing of the digital literary work to be shared, wherein a position of the identifier within the digital literary work is determined based on transmission rules between the main server and the agent server.

16. The method as set forth in claim 15, wherein at step d) if there is no search result value corresponding to the search condition, all the digital literary works having the identifier corresponding to the literary work requiring the protection of its copyright, which is inputted by the supervisor, are determined to be shared.

17. The method as set forth in claim 15, further comprising the step of calculating a dilution ratio of the number of digital literary works decided to be "pass" to the total number of searched digital literary works searched.

18. The method as set forth in claim 15, wherein the digital literary work having the identifier is the advertising digital literary work, formally produced and distributed for publicity by a writer, a production and distribution company of the literary work, or a server managing company.

19. The method as set forth in claim 15, wherein the digital literary work having the identifier is the digital literary work edited with a reduction in its quality to a level lower than that of an original digital literary work.

20. The method as set forth in claim 15, wherein the digital literary work having the identifier is a digital literary work encrypted with a predetermined encryption key.

21. The method as set forth in claim 15, wherein the identifier is inserted into the digital literary work by a company of managing the main server and the sub-server.

22. The method as set forth in claim 15, wherein the identifier is a watermark.

* * * * *

UNITED STATES PATENT AND TRADEMARK OFFICE
CERTIFICATE OF CORRECTION

PATENT NO. : 7,299,498 B2  Page 1 of 1
APPLICATION NO. : 09/977894
DATED : November 20, 2007
INVENTOR(S) : Lee et al.

It is certified that error appears in the above-identified patent and that said Letters Patent is hereby corrected as shown below:

Column 13,

Claim 15 Line 1, "form" should read --from--.

Signed and Sealed this

Thirteenth Day of May, 2008

JON W. DUDAS
*Director of the United States Patent and Trademark Office*